United States Patent [19]

Burke

[11] 4,009,103
[45] Feb. 22, 1977

[54] METHOD FOR IMPROVING THE FILTERABILITY OF ALUMINUM SALTS PRECIPITATED FROM AQUEOUS SOLUTIONS

[75] Inventor: Noel I. Burke, Danville, Ill.
[73] Assignee: Tee-Pak, Inc., Chicago, Ill.
[22] Filed: July 12, 1976
[21] Appl. No.: 704,704
[52] U.S. Cl. .................................. 210/51; 210/53; 423/122; 423/418
[51] Int. Cl.$^2$ .......................................... C02C 5/02
[58] Field of Search .............................. 210/51–54; 423/122–124, 417, 418

[56] References Cited
UNITED STATES PATENTS

| | | | |
|---|---|---|---|
| 2,952,517 | 9/1960 | Podall et al. | 423/418 |
| 3,798,160 | 3/1974 | Huffman | 210/54 |
| 3,880,612 | 4/1975 | Ostergren et al. | 423/417 |
| 3,893,916 | 7/1975 | Argabright et al. | 210/54 |
| 3,956,121 | 5/1976 | Haschke et al. | 210/53 |

*Primary Examiner*—Thomas G. Wyse
*Attorney, Agent, or Firm*—Paul Shapiro; Joseph E. Kerwin; William A. Dittmann

[57] ABSTRACT

The filterability of aluminum salts precipitated from an aqueous solution containing dissolved aluminum ion is improved by adjusting the pH of the solution to between about 4 and 6, adding less than a stoichiometric amount of a 1, 3-dicarbonyl compound such as acetylacetone to the solution to precipitate the aluminum dicarbonyl and then adding a sufficient amount of an alkaline hydroxide to precipitate the remaining dissolved aluminum ion in the form of aluminum hydroxide to obtain a mixed precipitate which can be readily filtered.

5 Claims, No Drawings

METHOD FOR IMPROVING THE FILTERABILITY OF ALUMINUM SALTS PRECIPITATED FROM AQUEOUS SOLUTIONS

BACKGROUND OF THE INVENTION

1. Field of the Invention

This invention relates to the treatment of waste effluent and more particularly to method of treating waste effluent from the manufacture of collagen food casings to remove and recycle aluminum salts present therein.

2. The Prior Art

Collagen casings have been widely accepted as edible food casings for pork sausages. In the preparation of edible collagen casings, hide collagen derived from bovine hides is converted into a finely divided fibrillar form and extruded in the form of a dilute collagen slurry. Usually, the extruded collagen is passed into a sodium sulfate or ammonium sulfate coagulating bath which dehydrates the collagen slurry and forms a coherent tubular collagen film. At this stage in the processing, the salt coagulated collagen film can be handled. However, removal of the ammonium sulfate or other coagulating salt from the film by washing will cause the collagen film to revert to a paste or slurry. It is therefore necessary to harden or tan the extruded collagen film to permit further processing of the film through the steps of washing, drying, shirring and stuffing.

One of the most widely used methods of tanning collagen casings is described in U.S. Pat. No. 3,123,481 which utilizes a tanning bath containing 3 to 18% by weight of a citrato complex of aluminum ammonium sulfate (alum). One drawback to this tanning process is that a small portion of the alum present in the bath eventually finds its way into process effluent and must be removed therefrom as its presence evokes a pollution problem. It is also desirable to recover the aluminum salt because of its economic value.

Most processes for the removal of soluble aluminum ion from effluent streams are generally based on the precipitation of the aluminum ion as the insoluble hydroxide. When the aluminum ion is present in small amounts, e.g., in the order 200–400 ppm, no problems are encountered with the precipitation method. Unfortunately when the aluminum concentration in the effluent stream increases to more substantial concentrations, e.g., in the order of 0.25–1.0% or more, as is the case in effluent from collagen tanning baths, the hydroxide precipitates in the form of a hydrated gel which is difficult to filter and separate from the effluent, the gel that forms often comprises half the volume of the effluent undergoing aluminum ion precipitation. In process effluent from the manufacture of collagen casings, the effluent also generally contains a high concentration, i.e. in the order of about 3% of other salts e.g. ammonium sulfate, ammonium lactate and ammonium citrate and these salts become trapped in the gel and further compound the problem of separating the gel from the effluent steam. Due to the contamination of the gel with these other salts, recycling of the aluminum salt is deterred.

SUMMARY OF THE INVENTION

In accordance with the present invention there is provided a method for improving the filterability of insoluble aluminum salts precipitated from aqueous solutions wherein an aqueous solution containing dissolved aluminum ion is adjusted to a pH between about 4 and 6, less than a stoichiometric amount of a 1, 3-dicarbonyl compound is added to the aluminum ion containing solution to precipitate a portion of the aluminum ion as insoluble aluminum dicarbonyl and then a sufficient amount of an alkaline hydroxide compound is added to the solution to precipitate the remaining aluminum ion in the form of an insoluble aluminum hydroxide.

As will hereafter be illustrated, by adjusting the pH of the aluminum ion containing solution to a value between 4 and 6 and then adding less than a stoichiometric amount of a 1, 3-dicarbonyl compound to the solution prior to precipitating the remaining aluminum ion as aluminum hydroxide, the resulting mixed precipitate is relatively easy to filter and the problems attendant with the filtration of aluminum hydroxide gel is virtually eliminated.

PREFERRED EMBODIMENTS

Exemplary of 1, 3-dicarbonyl compounds suitable for use in the practice of the present invention are compounds represented by the general formula

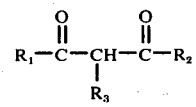

wherein $R_1$, $R_2$ and $R_3$ are similar or different members selected from the group of hydrogen, hydroxyl, alkoxy or alkyl groups containing 1 to 4 carbon atoms. Typical examples of such 1, 3-dicarbonyl compounds include acetoacetic acid, acetylacetone, propionylacetone, methyl acetoacetate, ethyl acetoacetate, methyl propionyl acetate and the like. The 1, 3-dicarbonyl compound preferred in the method of the present invention is acetylacetone.

The amount of 1, 3-dicarbonyl compound added to the solution containing the dissolved aluminum ion is proportonal to the concentration of aluminum ion present in the solution. The concentration of the 1, 3-dicarbonyl compound added to the aluminum ion containing solution is generally less than the stoichiometric amount that can react with the aluminum ion present in the solution and generally the 1, 3-dicarbonyl compound is added to the solution at a concentration of about 20 to about 50 mole percent based on the molar concentration of aluminum ion in the solution, which concentration is sufficient to improve the filterability of the mixed aluminum precipitate when the remaining aluminum ion is subsequently precipitated from the solution as aluminum hydroxide.

It is a critical feature of the present invention that the 1, 3-dicarbonyl compound be added to the aluminum ion containing solution prior to any attempt to precipitate the aluminum ion as the hydroxide in order to obtain improved filterability of the mixed aluminum dicarbonyl, aluminum hydroxide precipitate. It is a further critical feature of the present invention that the pH of the aluminum ion containing solution be adjusted to a value between 4 and 6 at the time of the addition of the 1, 3-dicarbonyl compound to the solution. If the pH of the aluminum ion containing solution is below 4 at the time of addition of the 1, 3-dicarbonyl compound, the improvement in filterability of the mixed aluminum salt precipitate will not be realized. If the pH is above 6, at the time of addition of the 1, 3-dicarbonyl compound, the subsequent precipitation of the aluminum ion as the hydroxide will be complicated by other reactions of aluminum ion, e.g. formation of basic aluminum salts of the dicarbonyl compound which can polymerize and cause further filtration difficulties.

Although concentrations of the 1, 3-dicarbonyl compounds in excess of about 50 mole percent based on the molar amount of aluminum ion present in solution may be employed, no real substantial improvement in filterability of the mixed aluminum dicarbonyl, aluminum hydroxide precipitate is obtained. The use of the 1, 3-dicarbonyl compound at a concentration range of about 20 to about 30 mole percent is preferred in the practice of the present invention.

After the addition of the 1, 3-dicarbonyl compound to the aluminum ion containing solution, the remaining aluminum ion may then be precipitated from the solution by adding thereto an alkaline hydroxide such as sodium hydroxide, potassium hydroxide or ammonium hydroxide. Ammonium hydroxide is the preferred alkaline hydroxide as it does not introduce any metal cations into the effluent being treated for aluminum ion removal. It has been also determined that the filterability of the aluminum hydroxide precipitate is enhanced if less than a stoichiometric amount of the precipitating hydroxide compound is added to the 1, 3-dicarbonyl compound treated solution. Preferably the amount of the alkaline hydroxide added to 1, 3-dicarbonyl compound treated solution ranges from about 50 to about 80 mole percent based on the molar concentration of the aluminum ion present in the solution.

To effect the quantitative precipitation of the aluminum ion, the pH of the 1, 3-dicarbonyl compound treated solution is raised to about 5.5 to 10 and preferably between about 7 and 8 by the addition of the alkaline hydroxide.

After the mixed aluminum salt precipitate has been filtered and separated, the 1, 3-dicarbonyl compound and particularly acetylacetone can be recovered by dissolving the aluminum salt precipitate in a mineral acid solution such as sulfuric acid or hydrochloric acid. Such acid solution treatment releases the acetylacetone which is relatively insoluble in water and has a specific gravity less than water and will float thereon whereby it can be decanted and recycled for use in the precipitation process. Acetylacetone that remains dissolved in the acid solution can be extracted from the aqueous solution using an organic solvent such as benzene or chloroform and then recovered by evaporation of the solvent.

Aluminum salts resulting from the acid dissolution of the aluminum hydroxide precipitate and particularly aluminum sulfate obtained by the sulfuric acid dissolution of the precipitate can be recycled and reused in the collagen casing manufacturing process.

The following examples are illustrative of the invention.

EXAMPLE 1

Process effluent from the manufacture of collagen sausage casings containing 0.5 percent by weight $Al^{3+}$ (5000 ppm) and 3.5% by weight of other salts was adjusted to a pH of 5. In a series of tests this effluent at pH 5 was treated with varying amounts of acetylacetone ranging from 0 to 100 mole percent based on the molar concentration (0.185 moles/liter) of the $Al^{3+}$ in the effluent. Thereafter, the $Al^{3+}$ was precipitated using varying amounts of ammonium hydroxide ranging from 0 to 100 mole percent based on the molar concentration of the $Al^{3+}$ present in the acetylacetone treated effluent. The concentration of $Al^{3+}$ remaining in the filtrate was measured and the ease of filtration of the aluminum hydroxide precipitate was observed and recorded. The results of these tests are recorded in Table I below.

TABLE I

| Test No. | Concentration of Acetylacetone (mole%) | Concentration of $NH_4OH$ (mole%) | Concentration of $Al^{3+}$ in Filtrate(ppm) | Observed Filterability of Al Salt Precipitate |
|---|---|---|---|---|
| 1. | 0 | 100 | 6.6 | Difficult to filter, about 55% of volume would filter |
| 2. | 10 | 90 | 5.2 | Difficult to filter, about 65–70% of volume would filter |
| 3. | 20 | 80 | 3.0 | Difficult to filter, about 70–80% of volume would filter |
| 4. | 30 | 70 | 3.2 | Easy to filter, about 95% of volume would filter |
| 5. | 40 | 60 | 5.7 | Easy to filter |
| 6. | 50 | 50 | 6.0 | Easy to filter |
| 7. | 100 | 0 | 6.1 | Easy to filter |

By reference to Table I it is immediately apparant that the filterability of the aluminum salt precipitate begins to significantly improve at an acetylacetone concentration of about 20 mole percent (Test No. 3) and the filtering of the precipitate can be accomplished with relative ease at an acetylacetone concentration in the concentration range of 30–40 mole percent (Test Nos. 4–5).

EXAMPLE II

The procedure of Example I was repeated with the exception that the amount of $Al^{3+}$ and other salts present in the effluent was varied. The results of these tests are recorded in Table II below.

TABLE II

| Test No. | Al³⁺ Concentration (%) | Other Salts Concentration (%) | Concentration of Acetylacetone (mole %) | Concentration of NH₄OH (mole %) | Observed Filterability of Al Salt Precipitate |
|---|---|---|---|---|---|
| 8. | 0.75 | 3.0 | 30 | 70 | Easy to filter, little or no gel |
| 9. | 0.75 | 5.0 | 30 | 70 | Easy to filter, little or no gel |
| 10. | 0.75 | 5.0 | 20 | 70 | Easy to filter, little or no gel |
| 11. | 0.75 | 5.0 | 20 | 80 | Easy to filter, little or no gel |
| 12. | 1.00 | 3.0 | 30 | 70 | Difficult to filter, some gel |
| 13. | 1.0 | 5.0 | 30 | 70 | Difficult to filter, some gel |
| 14. | 1.0 | 3.0 | 50 | 50 | Difficult to filter, some gel |
| 15. | 1.00 | 5.0 | 50 | 50 | Difficult to filter, some gel |

The results recorded in Table II indicate that the concentration of $Al^{3+}$ in the effluent has an effect on the amount of acetylacetone required to improve filterability of the aluminum salt precipitate i.e., the higher the concentration of $Al^{3+}$ in the effluent the higher the concentration of acetylacetone necessary to effect an improvement in filterability although at a concentration level of about 50 mole percent, the acetylacetone is effective over a wide range of $Al^{3+}$ concentrations. The presence of salts other than aluminum salts appears to have no noticeable effect on the efficacy of acetylacetone in improving the filterability of the aluminum salt precipitates.

What is claimed is:

1. A method for improving the filterability of aluminum salts precipitated from an aqueous solution containing soluble aluminum ions which method comprises adjusting the pH of the solution to between about 4 and 6, adding to the solution less than a stoichiometric amount based on the molar concentration of the aluminum ion of a 1, 3-dicarbonyl compound having the general formula

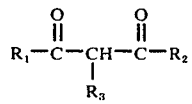

wherein $R_1$, $R_2$ and $R_3$ are selected from the group consisting of hydrogen, hydroxyl, alkoxy and alkyl groups to precipitate a portion of the aluminum ion as the unsoluble aluminum dicarbonyl and then adding a sufficient amount of alkaline hydroxide to precipitate the remaining aluminum ion in the form of insoluble aluminum hydroxide to obtain a mixed aluminum salt precipitate which is easily filterable.

2. The method of claim 1 wherein the 1, 3-dicarbonyl compound is acetylacetone.

3. The method of claim 1 wherein the amount of 1, 3-dicarbonyl compound added to the aluminum ion solution ranges from about 20 to about 50 mole percent based on the molar concentration of aluminum ion in the solution.

4. The method of claim 1 wherein the alkaline hydroxide added to the aluminum salt solution ranges from about 50 to about 80 mole percent based on the molar concentration of aluminum ion in the solution.

5. The method of claim 4 wherein the hydroxide compound is ammonium hydroxide.

* * * * *